US005130725A

United States Patent [19]

Schreyer et al.

[11] Patent Number: 5,130,725

[45] Date of Patent: Jul. 14, 1992

[54] APPARATUS FOR INTEGRATING AN OPTICAL CHARACTER GENERATOR IN A PRINTER HOUSING

[75] Inventors: Siegfried Schreyer, Glonn; Helmut Berger, Fürstenfeldbruck, both of Fed. Rep. of Germany

[73] Assignee: Siemens Aktiengesellschaft, Munich, Fed. Rep. of Germany

[21] Appl. No.: 576,390

[22] PCT Filed: Jun. 1, 1988

[86] PCT No.: PCT/DE88/00320

§ 371 Date: Sep. 14, 1990

§ 102(e) Date: Sep. 14, 1990

[87] PCT Pub. No.: WO89/08894

PCT Pub. Date: Sep. 21, 1989

[30] Foreign Application Priority Data

Mar. 15, 1988 [DE] Fed. Rep. of Germany ....... 3808638

[51] Int. Cl.[5] ........................ G01D 15/14; G01D 9/42

[52] U.S. Cl. ............................ 346/139 R; 346/107 R

[58] Field of Search ................ 346/139 R, 107 R, 145

[56] References Cited

U.S. PATENT DOCUMENTS 4,704,619 11/1987 Bierhoff et al. ................ 346/139 R 4,954,842 9/1990 Hashimoto et al. ............ 346/139 R

FOREIGN PATENT DOCUMENTS 0055549 5/1977 Japan ............................ 346/139 R

*Primary Examiner*—Benjamin R. Fuller

*Assistant Examiner*—David Yockey

*Attorney, Agent, or Firm*—Hill, Van Santen, Steadman & Simpson

[57] ABSTRACT

For projecting optical images onto a transfer printing drum of a non-mechanical printer, an apparatus is used with which the optical character generators can be introduced and removed adjustment-free. To that end, two fastening elements are provided in the printer housing and are adjusted at a constant spacing from the transfer printing drum. For the acceptance of the character generator these fastening elements comprise tapering guide slots that are each respectively fashioned ramp-shaped and into which guide pins of the character generator can be inserted, the character generator being fixed parallel to the rotational axis of the transfer printing drum as a result thereof. The apparatus provides for the adjustment-free integration of optical character generators, particularly for non-mechanical printers.

4 Claims, 3 Drawing Sheets

APPARATUS FOR INTEGRATING AN OPTICAL CHARACTER GENERATOR IN A PRINTER HOUSING

BACKGROUND OF THE INVENTION

1. Field of the Invention

This invention refers to an apparatus for integrating an optical character generator into a printer housing.

2. Description of the Related Art

The integration of optical character generators of non-mechanical printers in a corresponding printer housing is always accompanied by adjustments. The necessity for such adjustments is thereby explained based on the fact that the optical images generated by the character generator are projected onto a transfer printing drum through an imaging optics. The typical imaging scale of imaging optics that are employed lies at a ratio of 1:1. Since the imaging optics is preferably integrated fixed in the character generator, the distance of the surface of the imaging optics from the surface of the transfer printing drum must be optimally set so that the imaging quality is not inadmissably deteriorated by transgressing the depth of field of the imaging optics. Assuming that the character generator can be manufactured rather precisely, the setting of this distance, however, is greatly dependent on how exact the distance between the seating point of the character generator in the printer housing and the rotational axis of the transfer printing drum can be set. This setting precision is deteriorated by a statically changing untrue spindle running of the transfer printing drum. Since this untrue spindle running cannot be avoided, the depth of field of the imaging optics constantly varies within a certain range of tolerances. So that the quality losses are not further increased when imaging the optical images onto the surface of the transfer printing drum, the distance between the seating point of the character generator in the printer housing and the rotational axis of the transfer printing drum should be kept constant. This, however, the device including proves problematical when the character generator, for example in case of maintenance, is taken out of the printer housing and is then subsequently reintroduced thereinto.

A possibility of avoiding the problem is conceivable in that the distance is again re-adjusted after every integration of the character generator into the printer housing. What is especially disadvantageous given this type of procedure is that an individual adjustment error possibly deriving from constant adjustments will additionally deteriorate the imaging quality.

WO 88/00 739 discloses a fastening and setting mechanism for the exact arrangement of a character generator relative to a light-sensitive surface. What are characteristic of the fastening and setting mechanism are, first, a plurality of fixing or, respectively, locking elements with which a light emission arrangement arranged on a carrier element at both long sides of the character generator is detachably secured at a prescribed spacing from the light-sensitive surface. Over and above this, on the other hand, fastening and adjustment elements are also provided on the carrier element with which an imaging optics of the character generator can be adjusted between the light-sensitive surface and the light emission arrangement for an optimum imaging characteristic, for example resolution and depth of field of the latent electrostatic image on the light-sensitive surface.

SUMMARY OF THE INVENTION

The present invention is therefore based on the object of creating an apparatus of the species initially cited with which the adjustment of an optical character generator after the integration thereof in a printer housing is eliminated.

In an apparatus of the species initially cited, this object is inventively achieved in a device for the integration of the optical character generator, the device including guide rails provided in the printer housing via which guide rails the character generator is guided up to a first fastening element adjustably arranged in the printer housing that serves as a seat for the character generator; the first fastening element comprises a ramp via which the character generator proceeds to its seating position and comprises a guide slot for the acceptance of a guide pin allocated to the character generator; a second fastening element is adjustably arranged in the printer housing lying opposite the first fastening element, the character generator inserted into the printer housing being fixed on the second fastening element.

The solution is thereby particularly distinguished in that the optical character generator, when maintenance is required, can be integrated in functionally reliable fashion in the printer housing without additional adjustment and can even be replaced by a new character generator. This adjustment-free integration is guaranteed by two fastening elements arranged in the printer housing. The special characteristic of these fastening elements lies therein that they are adjusted such with a gauge during the assembly of the apparatus that the integrated character generator has a constant spacing from a transfer printing drum. With respect to this spacing, care must be exercised to see that manufacturing and assembly tolerances that arise do not exceed the available depth of field of an imaging optics of the character generator so that the imaging quality of optical images projected onto the transfer printing drum is not deteriorated in a lasting way. This is particularly true cf an untrue spindle running produced by the rotational motion of the transfer printing drum. Compared to manufacturing tolerances that occur in the internal structure of the character generator, the untrue spindle running can hardly be influenced despite an excellent seating of the transfer printing drum and is therefore unavoidable. The solution is further distinguished particularly in that the character generator is additionally secured parallel to the axis of the transfer printing drum in the adjusted position with reference to the transfer printing drum. Characteristically for this, guide pins of the character generator are provided that are arranged with form fit in guide slots of the fastening elements upon assembly.

Further advantages and developments of the invention include an apparatus in which the character generator comprises seating surfaces in a longitudinal direction at both of its ends. The apparatus is characterized in that a plate-shaped fixing element that projects out at both long sides of the character generator is secured on a seating surface in a recess. The apparatus may also include the character generator comprising running rollers that roll on the guide rails when the character generator is inserted into the printer housing.

The advantages of the invention are evident from the following description of an exemplary embodiment with reference to the drawings.

DETAILED DESCRIPTION OF THE PREFERRED EMBODIMENTS

Figure 1:
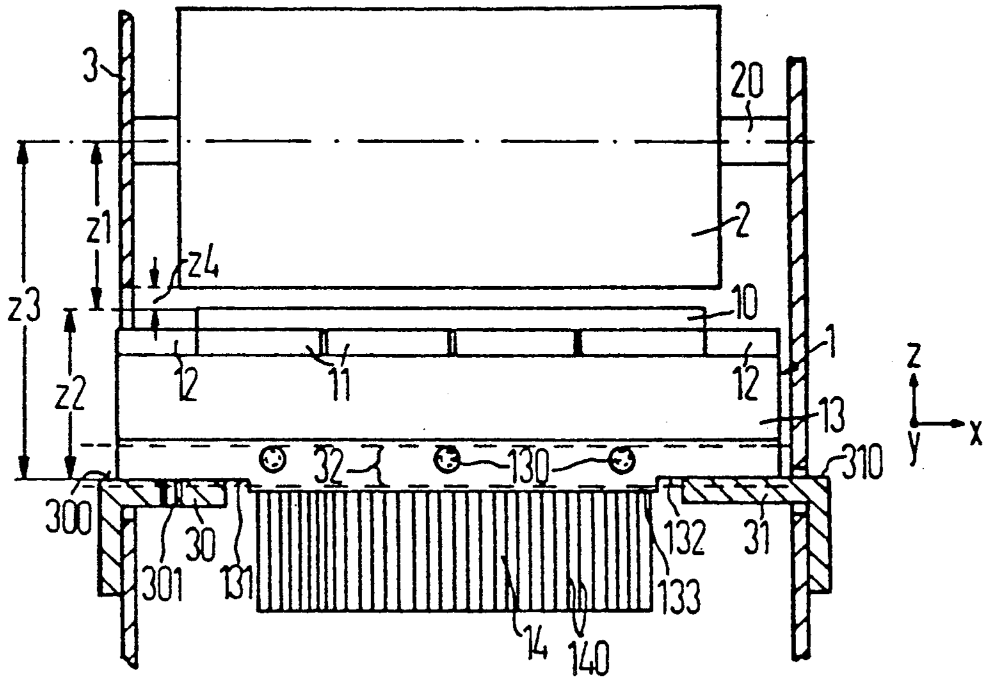
FIG. 1 a cross section through a fundamental substructure of an electrophotographic printer for generating a latent, electrostatic image.

FIG. 1 shows how a character generator 1 and a transfer printing drum 2 are built into a printer housing 3 of a printer. To that end, the transfer printing drum 2 is axially fixed on a spindle 20 that is rotatably seated in the printer housing 3. The character generator 1 is secured in the printer housing 3 under the rotatably seated transfer printing drum 2 at a variable spacing z3. To that end, the character generator 1 has both its ends mounted fixed on adjustable first and second fastening elements 31, 30. The first and second fastening elements 31, 30 that are annular in cross section are integrated such in the printer housing 3 that the position of the fastening planes 310 or, respectively, 300 of the first and second fastening elements 31, 30 with reference to the rotational axis of the transfer printing drum 2 can be adjusted to the spacing z3 with a gauge. The spacing z3 that is thus set is thereby composed of two different individual dimensions z1 and z2. It is indispensable for a faultless operation of the printer that an overall tolerance that is prescribed and must also be observed for the spacing z3 that has been set is not exceeded by manufacturing and mounting tolerances that occur for the two dimensions z1 and z2.

The overall tolerance is essentially defined by an imaging optics 10 of the character generator 1. For the sake of a good imaging quality, thus, the depth of field of the imaging optics 10 dare not be varied by the addressed tolerances. This may be explained based on the fact that picture elements of light sources, for example light-emitting diodes (LEDs) are reproduced on the transfer printing drum 2 by the imaging optics 10. These light sources are respectively arranged on an exposure module 11 that is connected with a positive lock to the web of a module carrier 13 that is fashioned T-shaped. Detent elements 12 that prevent a displacement of the exposure modules 11 in the x-direction during the operating condition of the character generator 1 are also provided on the web of the module carrier 13. The flange of the T-shaped module carrier 13 also comprises running rollers 130 that are respectively secured in pairs at the two long end face sides of the flange diametrically opposite one another. Over and above this, the base area of the flange is divided into two seating surfaces 132, 131 as well as into a step surface 133 offset from these two seating surfaces 132, 131 and on which a plurality of cooling plates 140 that form a cooling member 14 are secured, for example by being soldered.

For the operation of the printer, the character generator is thrust into the printer housing 3 as a result thereof that the running rollers 130 are movable in the x-direction in guide rails 32 of the printer housing 3, being thrust thereinto until the character generator 1 has its seating surfaces 131, 132 lying on the first and second fastening elements 31, 30 in the fastening planes 310, 300. The character generator 1 that is built in such fashion forms a structural unit together with the transfer printing drum 2 with respect to the dimensions z1 through z3 entered in FIG. 1, this structural unit only changing again given constantly changing, different manufacturing and assembling tolerances. Thus deriving, for example, with respect to a tangential spacing z4 between the transfer printing drum 2 and the imaging optics 10 are manufacturing tolerances that are based on a variable untrue spindle running of the transfer printing drum 2. When, for example, the overall tolerance to be demanded for the spacing z3 amounts to 0.1 mm and when, as a consequence of the untrue spindle running, a tolerance of likewise 0.1 mm is taken into consideration for the dimension z4 given what is the high-precision manufacture of the transfer printing drum 2 at the same time, then the character generator 1 must be manufactured with a precision of at least 0.01 mm in order to guarantee a faultless imaging of the picture elements of the light sources onto the transfer printing drum 2. Extremely high demands made of the structural design of the character generator 1 in the direction of the z-coordinate derive therefrom, these to be discussed below in the description of FIGS. 2 through 5.

Figure 2:
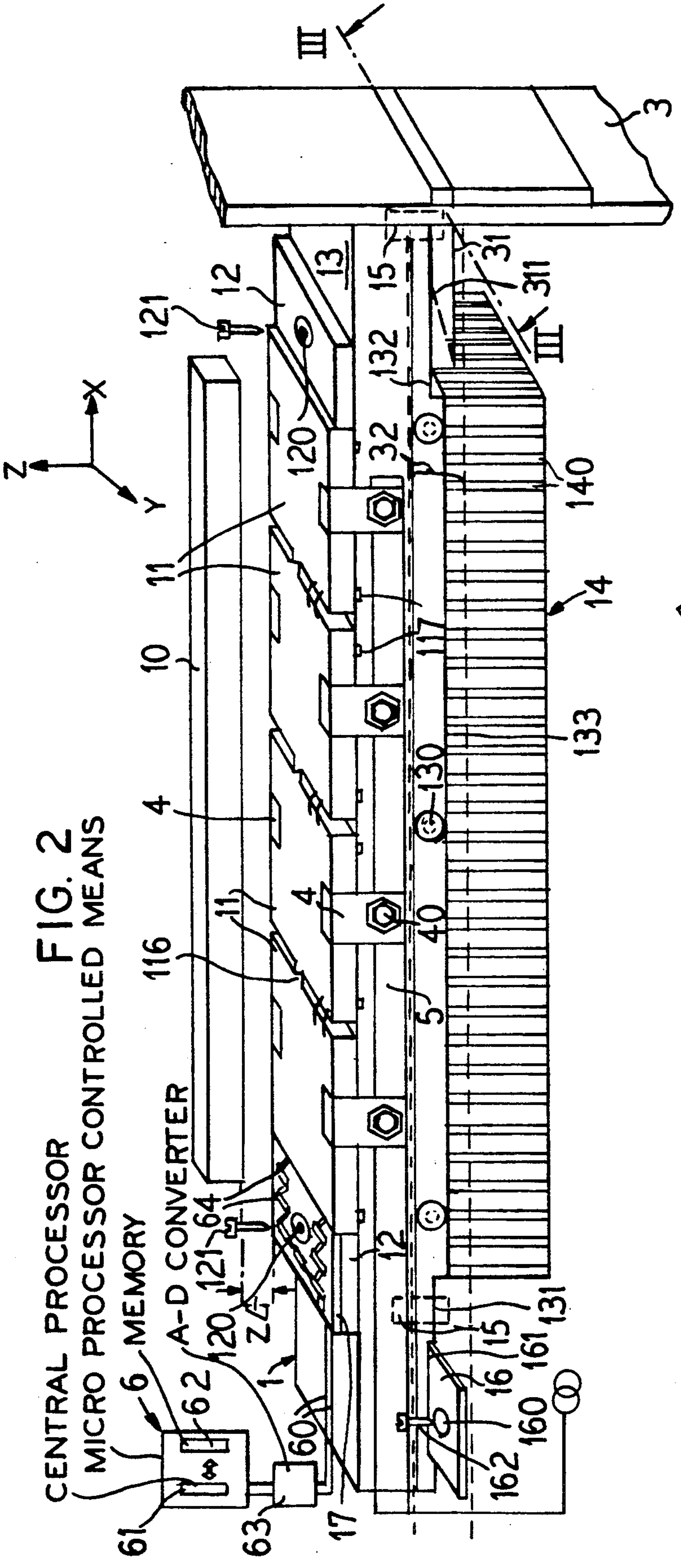
FIG. 2 a perspective, axonometric illustration of the structure of a character generator that generates latent, electrostatic images.
Figure 3:
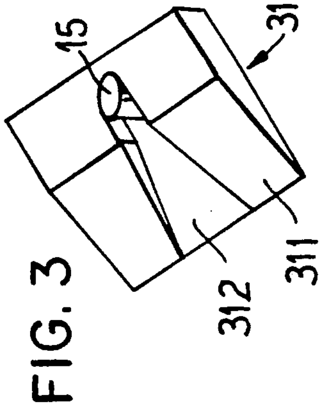
FIG. 3 a perspective view of a first fastening element for fixing the character generator.

To that end, FIG. 2 shows a perspective, axonometric illustration of the fundamental structure of the character generator 1. In longitudinal direction, the four exposure modules 11 indicated in FIG. 1 are arranged on the web of the module carrier 13 positively or non-positively locked thereon. For this purpose, both contacting surfaces, both that of the module carrier 13 as well as that of the exposure modules 11, are mechanically processed to an extremely high precision in a separate manufacturing cycle in order to achieve an air gap of less than 2 μm between the two contacting surfaces in the assembled condition. The exposure modules 11 arranged in this fashion abut one another at respect joining surfaces 116 that are fabricated with the utmost precision. Thus, the air gap between the adjoining surfaces 116 is likewise less than 2 μm. The abutting of the modules 11, however, occurs only in a very narrow region. The reasons for this shall be set forth in greater detail during the description of FIG. 3. So that this congruent adjacency of the respective modules 11 against one another is also preserved during the operating condition, the position of the exposure modules 11 on the module carrier 13 is fixed for all three coordinate directions. For the x-direction, the detent elements 12 have already been pointed out in the description of FIG. 1. A bore 120 is respectively let into the detent elements 12 in order to secure the detent elements 12 at a prescribed location on the web of the module carrier 13 with, for example, the assistance of fastening screws 121. In the mounted condition of the detent elements 12, the spacing of the bores 120 is dimensioned such that the modules 11 lying between the detent elements 12 are clamped with a positive lock in the x-direction. The form-fit fixing of the modules 11 in the y-direction and the z-direction is also achieved by seating pins 117 and by fastening devices which are not shown in FIG. 2. Over and above this, a printed circuit board 17 that is likewise fixed with the fastening screw 121 lies on the one detent element 12.

FIG. 2 also shows that the imaging optics 10 is arranged at a distance z4' above the module surface and that the exposure modules 11 comprise a flexible, electrical ribbon lead 4 at their end faces 117 that are respectively still free, being supplied with power for the light-emitting diodes and drive electronics via this ribbon lead 4. To that end, every flexible ribbon lead 4 is connected to a planar electrical lead line 5 via a screwed connection 40, this lead line 5 extending at both long sides of the module carrier web past all exposure modules 11 arranged on the module carrier 13, extending in the x-direction. The necessity of a lead line 5 designed in such a large-area way may be explained on the basis of the fact that currents of 80 through 100 A are not unusual due to the great number of light-emitting diodes integrated on the modules 11 of the character generator 1. The drive of the light-emitting diodes is undertaken via data and control lines 60 by a microprocessor-controlled means 6 that, among other things, contains a central processor 61 and a memory 62 for this purpose. This microprocessor-controlled means 6 is followed by an analog-to-digital converter 63 as well as by a plurality of amplifying driver modules 64 that are arranged on the printed circuit board 17. The signals are forwarded to the light-emitting diodes amplified on the data and control lines by the driver modules 64.

Under the seating surface 131, the character generator 1 also comprises a fixing element 16 fashioned plate-shaped and, under the seating surfaces 132 and 131, comprises a guide pin 15 that respectively projects from the module carrier 13. When, for integration into the printer housing 3, the character generator 1 is now inserted along the guide rail 32 with its guide rollers 130, then the guide pin 15 that thereby centrally projects under the seating surface 132 is brought along a ramp 311 of the first fastening element 31 into the detent shown in FIG. 3 of a guide slot 312 that tapers toward the detent. The taper of the guide slot 312 is dimensioned such that the guide pin 15 that projects under the seating surface 132 is fixed play-free in the y-direction. The positional fixing of the character generator 1 in the x-direction is effected by a plate-shaped fixing element 16. To that end, the fixing element 16 is secured in a recess 161 of the seating surface 131 with which it forms a flush surface such that a part of the fixing element 16 that is of the respectively same size projects out at both long sides of the character generator 1. A bore 160 is respectively let into the middle in this projecting part. When the character generator 1 has its seating surface 132 lying in the contacting plane 310 on the first fastening element 31 and when the character generator 1 likewise has its seating surface 131 in the contacting plane 300 lying on the second fastening element 30, then this is fixed in the x-direction by two fastening screws 162 that are let into a corresponding threaded bore 301 according to the illustration in FIG. 1. The character generator 1 or, respectively, the module carrier 13 is thus clearly fixed in all three coordinate directions with respect to the transfer printing drum 2 shown in FIG. 1.

Figure 4:
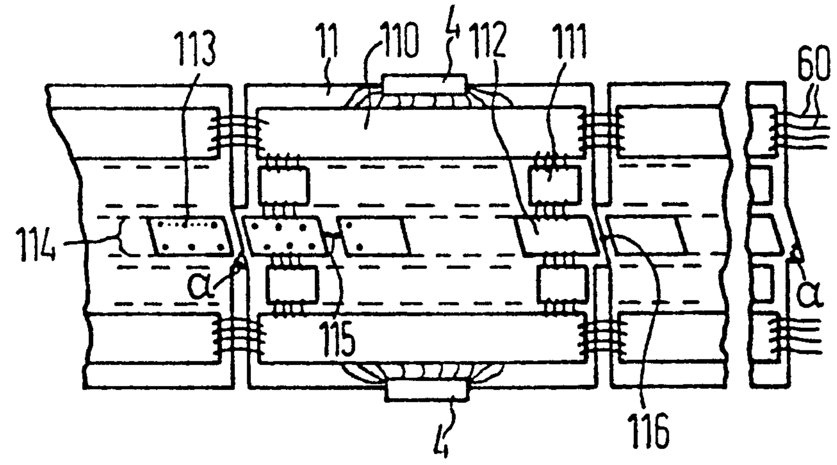
FIG. 4 the plan view onto an exposure module of the character generator that is required for generating latent, electrostatic images.

In order to be able to subsequently generate latent, electrostatic images on the transfer printing drum 2 with the character generator 1 positioned in this fashion and in order to thereby ultimately be able to print arbitrary characters on the recording medium, the light-emitting light sources 113 are monolithically integrated on the exposure modules 11 in common as shown in FIG. 4, in an exposure line 114 at a regular spacing, being integrated thereon as chips 112 having paired parallel sides and, dependent on the printing grid, containing 64 or 128 LEDs. Points are entered in FIG. 4 as LEDs to represent this. Moreover, the number 64 or, respectively, 128 for the number of LEDs 113 per chip 112 on the modules 11 of the character generator 1 is not arbitrarily selected; rather, it is based on conditions that are related to the digital drive of the LEDs 113. As may be seen in FIG. 4, an integrated circuit 111 is provided for this digital drive for every LED row of the chip 112 on the module 11. Each of these integrated circuits 111 is connected via a bus system 110 both to the flexible ribbon lead 4 as well as via the driver modules 64 on the printed circuit boards 17 to data and control lines 60 and, thus, each thereof is connected to the power supply or, respectively, to the microprocessor-controlled means 6. All printing data of the light-emitting diodes 113 in the exposure line 114 are stored and edited in this means 6.

Figure 5:
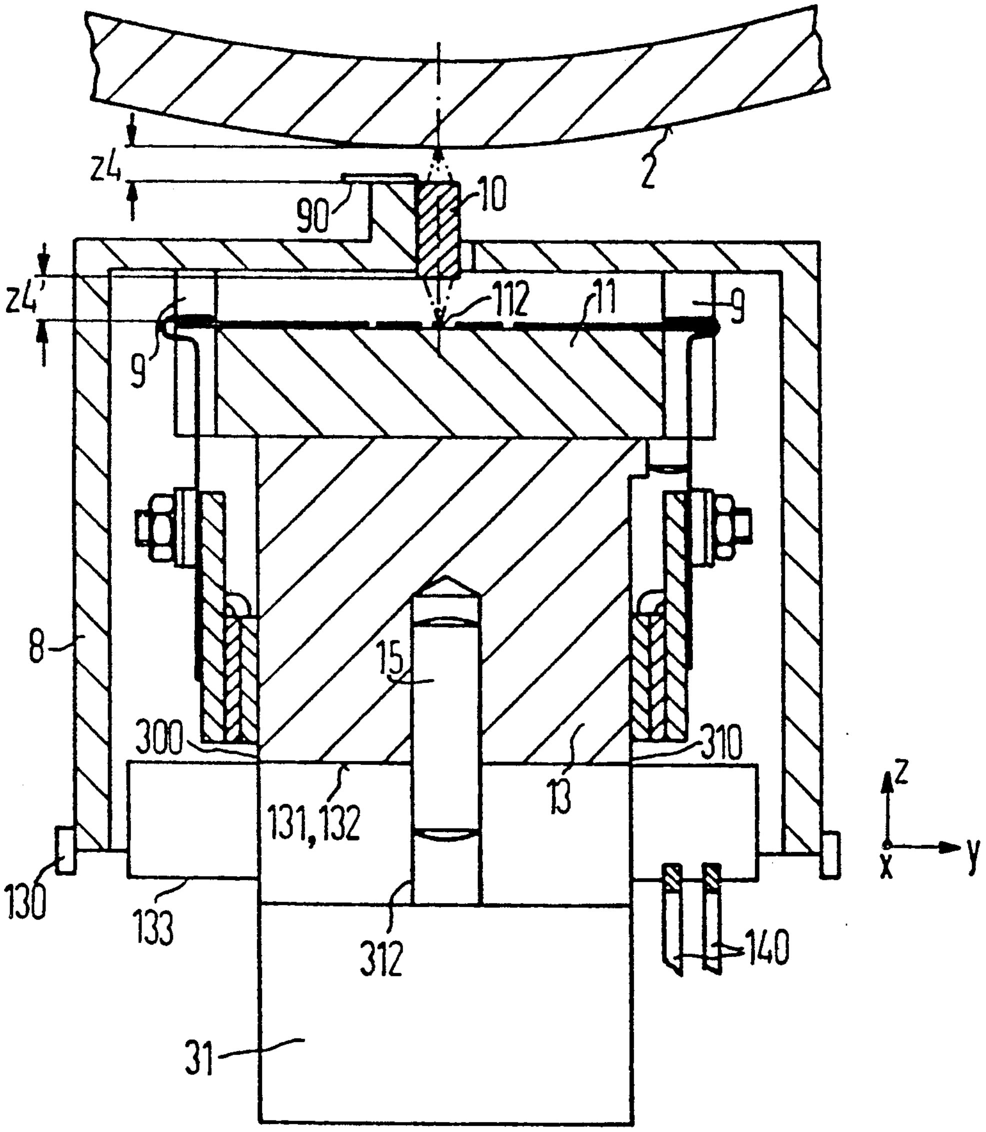
FIG. 5 a section through the character generator.

In a section through the character generator 1, FIG. 5 shows how this character generator is fixed in the y-direction in the printer housing 3. To that end, it is particularly shown how the guide pins 15 are let into the web of the module carrier 13. It is also shown how the imaging optics 10 is arranged in the z-direction and the y-direction with respect to the transfer printing drum 2 and the light sources 113 on the chip 112 of the exposure modules 11. With respect to its imaging geometry, the imaging optics 10 is of such a nature that the light points generated in the exposure line 114 of the exposure module 11 are respectively projected onto the transfer printing drum 2 in an imaging scale of 1:1. In order to achieve an extremely good imaging quality of the light points, the entered spacings z4 and z4' must be identical. To that end, the imaging optics 10 is integrated in a covering 8 and is centrally positioned with this over the exposure line 114 or, respectively, the chips 112. The covering 8 is in turn fixed relative to the exposure modules 11 by spacers 9. Over and above this, the covering 8 is designed such that the character generator 1 is protected against external contamination up to the running rollers 130, this external contamination particularly occurring when developing the latent, electrostatic images on the transfer printing drum 2. The imaging optics 10, which, according to FIG. 2, extends over the entire imaging line 114 of the character generator 1 and thereby projects every light point of the light-emitting diodes 113 onto the transfer printing drum 2 in the same imaging scale, is in turn protected against contamination by the closure mechanism 90 that does not cover the imaging optics 10 during the imaging process. To that end, the closure mechanism 90 is seated displaceable in the y-direction on the covering 8.

Although other modifications and changes may be suggested by those skilled in the art, it is the intention of the inventors to embody within the patent warranted hereon all changes and modifications as reasonably and properly come within the scope of their contribution to the art.

I claim:

1. An apparatus for integrating an optical character generator in a printer housing, comprising:

a first fastening element adjustably arranged in the printer housing to serve as a seat for the character generator;

guide rails being provided in the printer housing, the character generator being guided up to the fastening element on said guide rails;

the first fastening element including: a ramp, the character generator proceeding on said ramp to a seating position, and a guide slot for accepting a guide pin allocated to the character generator;

and a second fastening element adjustably arranged in the printer housing lying opposite the first fastening element, the character generator inserted into the printer housing being fixed on said second fastening element.

2. An apparatus according to claim 1, wherein ends of the character generator comprise seating surfaces in a longitudinal direction.

3. An apparatus according to claim 2, further comprising: a plate-shaped fixing element that projects out at sides of the character generator, said fixing element being secured on a seating surface in a recess to fix the character generator on said first fastening element.

4. An apparatus according to claim 1, wherein the character generator comprises running rollers that roll on the guide rails when the character generator is inserted into the printer housing.

* * * * *